United States Patent [19]

Markle et al.

[11] Patent Number: 5,387,667
[45] Date of Patent: Feb. 7, 1995

[54] THERMALLY-REVERSIBLE ISOCYANATE-BASED POLYMERS

[75] Inventors: Richard A. Markle, Columbus; Joel D. Elhard, Hilliard; Donald M. Bigg, Columbus; Sylvester Sowell, Columbus; Phyllis L. Brusky, Columbus; George E. Cremeans, Groveport, all of Ohio

[73] Assignee: Battelle Memorial Institute, Columbus, Ohio

[21] Appl. No.: 103,098

[22] Filed: Aug. 9, 1993

Related U.S. Application Data

[60] Division of Ser. No. 740,335, Aug. 5, 1991, Pat. No. 5,239,039, which is a continuation-in-part of Ser. No. 651,020, Feb. 4, 1991, Pat. No. 5,097,010, which is a continuation-in-part of Ser. No. 475,112, Feb. 5, 1990, abandoned.

[51] Int. Cl.⁶ .............................................. C08G 75/04
[52] U.S. Cl. ...................................... 528/374; 528/44; 528/73; 528/364; 528/390; 427/226
[58] Field of Search ................... 528/44, 73, 364, 374, 528/390; 427/226

[56] References Cited

U.S. PATENT DOCUMENTS

| | | | |
|---|---|---|---|
| 2,777,831 | 1/1957 | Seeger et al. | 260/75 |
| 2,876,725 | 3/1959 | Buck et al. | 113/120 |
| 2,983,754 | 5/1961 | Sheffer et al. | 260/33.4 |
| 3,115,479 | 12/1963 | Windemuth et al. | 260/17 |
| 3,215,668 | 11/1965 | Bissinger et al. | 260/47 |
| 3,267,083 | 8/1966 | Imhof | 260/80.5 |
| 3,503,927 | 3/1970 | Chang et al. | 260/47 |
| 3,513,131 | 5/1970 | Marin et al. | 260/75 |
| 3,578,727 | 5/1971 | Battersby et al. | 260/830 |
| 3,591,562 | 7/1971 | Patton . | |
| 3,624,045 | 11/1971 | Stivers | 22/4 |
| 3,644,569 | 2/1972 | Pletsch et al. | 260/835 |
| 3,684,769 | 8/1972 | Abbott et al. | 22/12 |
| 3,734,896 | 5/1973 | Patton | 260/77.5 AM |
| 3,759,873 | 9/1973 | Hudak | 260/75 |
| 3,760,117 | 7/1988 | Evans et al. | 525/394 |
| 3,847,878 | 11/1974 | Hanson et al. | 260/73 |
| 3,925,462 | 12/1975 | Graff | 560/26 |
| 3,933,758 | 1/1976 | Patton | 260/77.5 CH |
| 3,987,016 | 10/1976 | Haddad et al. | 260/79.1 |
| 4,046,749 | 9/1977 | Hawkins | 260/79 |
| 4,048,253 | 9/1977 | Ooba et al. | 260/858 |
| 4,064,107 | 12/1977 | Stackman et al. | 260/47 |
| 4,104,443 | 8/1978 | Latta et al. | 428/474 |
| 4,166,873 | 9/1979 | Gilliam et al. | 428/35 |
| 4,176,223 | 11/1979 | Irwin | 528/170 |
| 4,201,853 | 5/1980 | Henry et al. | 528/85 |
| 4,205,150 | 5/1980 | Marubashi | 526/252 |
| 4,221,887 | 9/1980 | Brenner et al. | 525/332 |
| 4,289,813 | 9/1981 | Blomeyer, deceased et al. | 427/385.5 |
| 4,338,422 | 7/1986 | Jackson, Jr. et al. | 525/461 |

(List continued on next page.)

FOREIGN PATENT DOCUMENTS 0249809 12/1987 European Pat. Off. .

(List continued on next page.)

OTHER PUBLICATIONS

Wagener, K. B. et al, "Thermally Reversible Urethanes", Polymer Preprints, vol. 30, No. 1 (Apr., 1989) pp. 287–288.

Caraculacu, G. et al., "Poly(urethane-parabanic (List continued on next page.)

Primary Examiner—John Kight, III
Assistant Examiner—Duc Truong
Attorney, Agent, or Firm—Watkins, Dunbar & Pollick

[57] ABSTRACT

Thermally-reversible polymer compositions are obtained by reacting compounds with isocyanate and labile-hydrogen functionality. High-performance characteristics are incorporated into the polymer by using aromatic polycarbonate, aromatic polyester, polyarylsulfide, and polyarylimidazolidine oligomers. The compositions are useful as hot-melt adhesives, coatings and especially finish surface coatings on composite materials such as polypropylene and polyethylene terephthalate, moldings and in injection reaction molding applications and composite and laminate fabrication.

4 Claims, 2 Drawing Sheets

U.S. PATENT DOCUMENTS

| | | | |
|---|---|---|---|
| 4,352,858 | 10/1982 | Stanley | 428/423.1 |
| 4,354,008 | 10/1982 | Skoultoni | 525/370 |
| 4,360,638 | 11/1982 | Bartman | 524/286 |
| 4,417,043 | 11/1983 | Coswell et al. | 528/176 |
| 4,423,182 | 12/1983 | Bartman | 524/367 |
| 4,471,106 | 9/1984 | Luecke et al. | 528/205 |
| 4,503,285 | 3/1985 | Darms | 174/68.5 |
| 4,524,104 | 6/1985 | Magio et al. | 428/341 |
| 4,539,384 | 9/1985 | Krishman et al. | 528/79 |
| 4,579,930 | 4/1986 | Kramer et al. | 528/71 |
| 4,608,418 | 8/1986 | Czerwinski et al. | 524/296 |
| 4,619,975 | 10/1986 | Matzner et al. | 525/437 |
| 4,623,731 | 11/1986 | Ivanou et al. | 548/374 |
| 4,657,989 | 4/1987 | Evans | 525/464 |
| 4,659,762 | 4/1987 | Jenkins | 524/331 |
| 4,659,789 | 4/1987 | Katto et al. | 525/537 |
| 4,668,744 | 5/1987 | Matzner et al. | 525/397 |
| 4,687,785 | 8/1987 | Parker et al. | 521/106 |
| 4,690,856 | 9/1987 | Ito et al. | 428/215 |
| 4,695,612 | 9/1987 | Takekoshi et al. | 525/433 |
| 4,699,974 | 10/1987 | Evans | 528/354 |
| 4,722,993 | 2/1988 | Hisgen et al. | 528/183 |
| 4,725,384 | 2/1988 | Du Vernet | 260/104 |
| 4,727,131 | 3/1988 | Kock et al. | 528/183 |
| 4,728,713 | 3/1988 | Hisgen et al. | 528/183 |
| 4,728,714 | 3/1988 | Hisgen et al. | 528/183 |
| 4,734,470 | 3/1988 | Kawabata et al. | 525/537 |
| 4,744,852 | 5/1988 | Augustin et al. | 156/327 |
| 4,748,229 | 5/1988 | Hisgen et al. | 528/183 |
| 4,767,877 | 8/1988 | Shannon et al. | 558/281 |
| 4,769,424 | 9/1988 | Takekoshi et al. | 525/435 |
| 4,775,719 | 10/1988 | Markeuka et al. | 525/125 |
| 4,788,261 | 11/1988 | Taguchi et al. | 525/452 |
| 4,791,187 | 12/1988 | Suling et al. | 528/60 |
| 4,808,255 | 2/1989 | Markeuka et al. | 156/307.3 |
| 4,820,368 | 4/1989 | Markeuka et al. | 156/307.3 |
| 4,837,284 | 6/1989 | Matzner et al. | 525/437 |
| 4,841,009 | 6/1989 | Kelsey | 528/75 |
| 4,851,278 | 7/1989 | Enanoza | 428/195 |
| 4,863,767 | 9/1989 | Garg et al. | 428/1 |
| 4,868,268 | 9/1989 | Miller et al. | 528/76 |
| 4,882,399 | 11/1989 | Tesuro et al. | 525/523 |
| 4,895,920 | 1/1990 | Mormann et al. | 528/76 |

FOREIGN PATENT DOCUMENTS

| | | | |
|---|---|---|---|
| 0259968 | 3/1988 | European Pat. Off. | C09J 13/14 |
| 2023697 | 11/1970 | Germany . | |
| 3723610 | 2/1988 | Germany . | |
| 2108137 | 5/1983 | United Kingdom . | |
| 2123841 | 7/1983 | United Kingdom . | |

OTHER PUBLICATIONS acid)s", Makromol. Chem., vol. 185, (1984), pp. 1079-1039.

Caraculacu, G., et al., "Copolymer of Poly(parabanic acid) and Polyimide", Journal of Polymer Science: Polyme Letters Edition vol. 21, pp. 277-280 (1983).

Patton, T. L., "Poly(iminoimidazolindinediones) and Poly(parabanic acids)", Polymer Reprints, vol. 12, No. 1, (Mar. 1971), pp. 162-169.

Daccord, G. et al., "α-ω-Difunctionalized Poly(p-thiophenylene) Oligomers", Polymer Bulletin (1981), pp. 459-466.

Koch, W. et al., "Models and Mechanisms of the Formation of Poly(thio-1,4-phenylene)", Makromol. Chem. vol. 184, (1983), pp. 779-793.

Lovell, P. et al., "Synthesis and Characterization of Poly(arylene sulfides)", Makromol. Chem., vol. 199, (1987), pp. 1561-1573.

Daccord, G. et al., "Oligo(thiophenylenes-1,4)α,-ω-difunctionnalises, 4", Makromol., vol. 184, pp. 1869-1876, (French with English Summary).

Daccord, G. et al., "Difunctional Poly(p-phenylene sulfide)oligomers, Polymer Bulletin, vol. 6 (1982), pp. 477-484.

Lovell, P. A. et al., "Synthesis and Characterization of Poly(arylene sulfides),7", Makromol Chem., vol. 188, (1987), pp. 1551-1560.

Lovel, P. et al., "Synthesis and Characterization of Poly(arylene sulfides),6", Makromol. Chem., vol. 188 (1987), pp. 1537-1549.

Duda, A. et al., "Sulfur-Containing Polymers", in: Encyclopedia of Polymer Science and Engineering, vol. 16, (1989), pp. 246-368.

Sergeev, V. A. et al., "Sulfur-Containing Polymers", Vysokomol, Soedin, Ser. B, vol. 27, (1985), p. 740 (Russian: no translation).

Sergeev, V. A. et al., "Sulfur-Containing Polymers", Vysokomol, Soedin, Ser. B., vol. 29, (1987), p. 527 (Russian, no translation).

Annenkova, V. Z. et al., "Sulfur-Containing Polymers", Vysokomol, Soedin, Ser. B, vol. 27, (1985), p. 346 (Russian; no translation).

Garbarczyk, J., "Molecular and Crystal Structure of Bis(4-mercaptophenyl)Sulfide as a model compound for Poly(1,4-phenylenesulfide)", Makromol. Chem., vol. 187, (1986), pp. 2489-2495.

Daccord, G., et al., "Oligo(thiophenylenes-1,4)α,-ω-difonctionnalisés, 3", Makromol. Chem., vol. 184 (1983), pp. 1861-1867 (French with English Summary).

Sergeev, V. A. et al., "Synthesis and Properties of Sulfur-Containing Oligodiamines and Epoxy Polymers based on them", Vysokomol.

(List continued on next page.)

OTHER PUBLICATIONS

Soedin, Ser. A., vol. 25, No. 6 (1983), pp. 1311–1315 (Russian with Abstract Chemical Abstracts, vol. 99, No. 12, Abstract No. 89006w).

*Chemical Abstracts,* vol. 101, No. 10, Abstract No. 73274f, Japan Toshiba Corp., "Polysulfide–Polycarbonated", JP 59–4,621 A2.

Chemical Abstracts, vol. 102, No. 22, Abstract No. 185966k, Toray Industries, Inc., "Poly(phenylene sulfide) Compositions", Jpn. Kokai Tokkyo Koho, JP 59–204,657 A2, 20 Nov. 1984, Japan Patent Application.

Chemical Abstracts, vol. 99, No. 2, Abstract No. 6117; Koch, W. et al., "Models and Merchanism of the Formation of Poly(thio-1,4-phenylene)", Makromol. Chem. 184(4), 779–92 (1983).

Chemical Abstracts, vol. 84, No. 24, Abstract No. 165535a, Hawkins, R. T., "Chemistry of the Cure of Poly(p-phenylene-sulfide)", Macromolecules, vol. 9, No. 2, (1976), pp. 189–194.

Chemical Abstracts, vol. 78, No. 22, Abstract No. 136845x, Montaudo, G. et al., "Bridged Polyaromatics", Synthesis and Isomorphous Properties of Polymers and Oligomers containing Oxygen, Sulfur or Methylene Bridges", J. Polym. Sci., Polym. Chem. Ed., vol. 11, No. 1, (1973), pp. 65–79.

Chemical Abstracts, vol. 104, No. 18, Abstract No. 150209c, Liang, Y., "Thermoset Polymer Production", 115.4, 563, 509, Jan. 7, 1986.

Chemical Abstracts, vol. 102, No. 24, Abstracts No. 204835k, Wejchan–Judek, M. et al., "A New Method of Curing Poly(phenylene sulfide)", Polym. Degrad. Stab., vol. 11, No. 1, (1985), pp. 55–26.

Chemical Abstracts, vol. 108, No. 12, Abstract No. 95043b, Bizzari, C. et al, "Synthesis of Intramolecularly Cyclized Poly(phenylenesulfides) of the Thianthrene-type", J. Polym. Sci., Part A: Poly. Chem., vol. 26, No. 1, (1988), pp. 255–265.

Chemical Abstracts, vol. 91, No. 14, Abstract No. 158341a, Sergeev, V. A. et al., "Poly(acylene-sulfides)", U.S. 4,676,597; Jul. 30, 1979; USSR Patent.

Chemical Abstracts, vol. 99, No. 12, Abstract No. 89006w, Sergeev, V. A. et al., "Synthesis and Properties of Sulfur-Containing Oligodiamines and Epoxy Polymers Based on them", Vysokomol, Ser. A., vol. 25, No. 6, (1983), pp. 1311–1315.

Chemical Abstracts, vol. 67, 1967, Abstract No. 91314c, Dieterich, D. (Bayer), "Polyurethanes", GB 1,808,590; Aug. 23, 1967; British Patent.

Bruma, M. et al., "Ordered Polyesterimides", Revue Roumaine de Chimie, vol. 30, (1985), pp. 239–244.

Kaicheldorf, H. et al., "New Polymer Synthesis, 7: Synthesis and Characterization of Oligomeric and High Molecular Weight Poly(4-hydroxybenzoate)", Makromol. Chem., vol. 184, (1983), pp. 475–496 (p. 483 missing).

Derwent Abstract, JP63-161-020A; Jul. 4, 1988; Nippon Ester "Random Copolyester with Thermotropic Liquid Crystal Property—includes Units obtained from Aromatic Di–Tri–and Tetra–Carboxylic Acids, and Aromatic Phosphorus Compound", Japanese Patent Application.

*Chemical Abstract,* (unknown volume and abstract number), Cadiz, et al, Polymers Containing Titanium II", Rev. Plastic Mod., vol. 31, No. 236, (1976), pp. 193–202.

Chemical Abstract, vol. 85, No. 10, Abstract No. 63357x, Korshak, V. V. et al., "Polyester Imides with Regular Alternation of Ester and Imide Groups", Vopr. Fiz.–Khim. Polim., vol. 1, 1972, pp. 67–73.

Derwent Abstract, 89–009936/02, EP 298,884 A; Jan. 11, 1989, European Patent Application; Quentin, J. P., "Mouldable Thermotropic Aromatic Copolyesteramide".

Derwent Abstract, 89–009935/02, EP 298,883 A; Jan. 11, 1989; European Patent Application, Quentin, J. P., "Thermotropic Aromatic Copolyesteramide".

Derwent Abstract, JP 58-091-818 A; May 31, 1983; Japan Patent Application; Asani Chemical, "Fiber or Film of Polyester containing Imide Group obtained by Melting Polyester Containing Imide Units; Extruding and Heat-Treating".

Derwent Abstract, DE 3,542,796 A; Jun. 11, 1987; W. Germany; Hisgen, B. et al., "Aromatic Mesomorphic Polyester-Amide-Imide(s)-from Diphthalimido-Diphenyl Compounds, Terephthalic and Isophthalic Acids, Amino-Phenols, Aminoacids Hydroxy-Benzoic Acid, etc".

(List continued on next page.)

OTHER PUBLICATIONS

Derwent Abstract, DE 3,542,798 A; Jun. 11, 1987; W. Germany; Hisgen, B. et al., "Aromatic Mesomorphic Polyesteramideimides-from Diphthalimido-Diphenyl Compounds Terephthalic and or Isophthalic Acids, Tertiary Butyl Hydroquinone, Aminophenols Aminocarboxylic Acids, etc.".

Derwent Abstract, EP 272–992 A; Jun. 29, 1989; European Patent Application; Quentin, J. P., "Shapable Thermotropic Aromatic Copolyesteramides Containing Units of a Substituted Hydroquinone, p-Aminobenzoic Acid, and Optionally other Aromatic Dicarboxylic Acids".

Derwent Abstract, DE 3,542,813 A; Jun. 11, 1987; Kock, H. J. "Aromatic Mesomorphic Polyetheresters—from Hydroxy Benzoic Acid, Terephthalic Acid, Di(p-hydroxyphenoxy)phenyl Sulphone, Tertiary Butyl Hydroquinone".

Derwent Abstracts, DE 3,542,778 A; Jun. 11, 1987; Portugal, A., "Aromatic Mesomorphic Polyesteresters—from Hydroxy Benzoic, Terephthalic Acid, Hydroquinone, Dihydroxy Diphenyl and Di(p-hydroxyphenoxy)phenyl Sulphone".

Derwent Abstracts; EP 213899 A; Mar. 11, 1987; Nippon Oil, "Cholesteric Liquid Crystal Polyester—containing Units of Cyclohexane Dicarboxylic Acid, 3—methyl Adipic Acid and optionally substituted Hydroquinone".

Chattopadyay, K. B. et al., "Synthesis and Characterization of Novel Polyurethane Cationomer", Polymer Communication, vol. 30, No. 1, (Jan. 1990), unknown.

Ding, Y. S. et al., "Synthesis and Characterization of Sulphonated Polyurethane Ionomers Based on Toluene Diisocyanate", Polymer, vol. 30, (Jul. 1989), pp. 1204–1211.

Lee, D. et al., "Methylenebis(p-phenyl isocyanate)—based Polyurethane Ionomers, I. New Small Angle X-Ray Scattering Model", Macromolecules, vol. 21 (1988), pp. 998–1004.

Bazuln, C. "Modification of Polymer Properties Through Ion Incorporation", Ind. Eng. Chem. Prod. Res. Dev., vol. 20, (1982), pp. 271–286.

MacKnight, W. J. et al., "Elastic Ionomers", Rubber Chemistry and Technology, vol. 57, pp. 652–663.

Longworth, R., "Thermoplastic Ionic Polymers: Ionomers", In: Holliday, L. Ionic Polymers, (1975), Chpt. 2, pp. 69–170 (partial copy).

Phillips, P. J., "Some Electron Microscopial Investigations of Ionomeric Materials", Polymer Letters, vol. 10, (1972), pp. 443–447 (partial copy).

Phillips, P. J., "Mechanical Nical and Thermal Properties of Phosphorylated Polyethylene", Polymer Letters, vol. 8, (1970), pp. 87–94.

Dieterich, Von. D. et al., "Polyurethan-Ionomere, Eine Nelle Klasse Von Sequenzpolymeren", Angewandete Chemie, vol. 82, No. 2, (1970), (53–57 only; German).

Dieterich, D. et al., "Polyurethane Ionomers, A New Class of Block Polymers", Angew. Chem. Internat. Edit., vol. 9, (1970), pp. 40–50.

Phillips, P. J. et al., "Structure and Properties of Polyethylene Modified with Phosphonic Acid Side Groups. I. Mechanical and Thermal Studies".

Thermal Studies of Polyethylene, vol. 3, No. 6, (Nov.–Dec. 1970), pp. 767–771.

Eisenbert, A., Ions in Polymers, Advances in Chemistry Series 187, includes portions of the following chapters:

Makowski, H. S. et al., "Synthesis and Properties of Sulfonated EDPM", Chpt. 1, pp. 3–19 (partial copy).

Lundberg, R. D. et al., "A Comparison of Sulfonate and Carboxylate Ionomers", Chpt. 2, pp. 21–36 (partial copy).

Makowski, H. S. et al., "Plasticization of Metal Sulfonate-containing EPDM with Stearic Acid Derivatives", Chpt. 3, pp. 37–51 (partial copy).

Brenner, D. et al., "Effect Counterion Structure on Ionomer Properties: Quaternary Phosphonium Countarions in Sulfonated EDPM", Chpt. 4, pp. 53–66 (partial copy).

Lundberg, R. D., "The Dual Plasticization of Sulfonated Polystyrene Ionomer", Chpt. 5, pp. 67–76 (partial copy).

Rahrig, D., "Thermal and Dynamic Mechanical Properties of Sulfonated Polypentenamers", Chpt. 6, pp. 77–89 (partial copy).

Noonan, D., "Thermally and Dynamic Mechanical Properties of Sulfonated Polyentenamers", Chpt. 6, pp. 77–89 (partial copy).

Chemical Abstracts, vol. 65, No. 17, Abstract No. 17170c, Netherlands Patent Application 6,515,558, Bayer AG, "Anion Forming Polyurethanes", NL 65 15,558; Jun. 7, 1966.

Chemical Abstracts, vol. 63, Abstract No. 5868a, Bayer AG, "Polyurethane Latexes Containing Water and Free of Emulsifying Agents", 1965, NL 64 10,928, Mar. 29, 1965, Netherlands Patent Application.

(List continued on next page.)

OTHER PUBLICATIONS

Chemical Abstracts, vol. 55, Abstract No. 2184d, Thoma et al. (Bayer AG), "Water-Soluble Polyureas", DE 1,042,892; Nov. 6, 1958; German Patent.

Chemical Abstract, vol. 55, Abstract No. 10912f, Thoma et al. (Bayer AG), "Soluble Polyureas for Textile Treatment and Pharmaceutical Use", DE 1,067,212; Oct. 15, 1959; German Patent.

Chemical Abstracts, vol. 77, p. 63, Abstract No. 141337s, Garforth, J. D., "Fiber-Forming Polyamides Having Improved Affinity for Basic Dyes", U.S. Pat. No. 3,682,866 (Aug. 8, 1972).

Chemical Abstracts, vol. 74, p. 33, Abstract No. 126517v, Heiberger, P., "Aqueous Dispersion of Copolyesters Modified with a Sulfonated Aromatic Compound", U.S. Pat. No. 3,563,942 (Feb. 16, 1971).

Chemical Abstracts, 1962, Abstract No. 8762g, Griffing, J. M. et al., "Sulfonate Containing Polyesters Dyeable with Basic Dyes", U.S. Pat. No. 3,018,272 (Jan. 23, 1962).

Chemical Abstracts, vol. 83, p. 494, Abstract No. 186380r, Arcest, J. A. et al., "Photographic Product Using Photosensitive Polymers for Lithographic Use", Belgium Patent 819,906.

Harris, F. W., "Synthesis of Aromatics Polyimides from Dianhydrides and Diamines", In: Hergenrother, P. M., Recent Advances in Polyimides and Other High Performance Polymers, Jan. 22–25 (1990) (partial copy).

Botwell, M. "Adhesives Overseas, Bostik European Focuses on Reactive Hot Melts", Adhesive Age, Sep. 1987, pp. 42–43.

Endo, H. "Peel Adhesion of the Reaction Type Blend of Saponified Ethylene-Vinyl Acetate Copolymer and Polyurethane", Osaka-Furitsu Kigyo Gijutsukenkyusho Hokoku, vol. 88, (1986), pp. 26–30 (Japanese; No Translation) Chemical Abstract, vol. 106, No. 22, Abstract No. 177390k.

High Temperature Polymers and Their Uses, Society of Plastics Engineers, Oct. 2–4, 1989.

Hespe, H. F., "Polyurethanes (Pur)", In: Engineered Materials Handbook, Engineering Plastics, vol. 2, 1988, pp. 257–264.

Frisch, K. C. et al., "Formulating Polurethane-Adhesives and Sealants", Adhesives Age (Sep. 1988), pp. 41–54.

Frisch, K. C. et al., "Applications for Polyurethanes: Adhesives, Sealants, Binders", Adhesive Age, (Oct. 1988), pp. 227–229.

Kimball, M. E., "Reactive Hot-Melt Adhesive and Sealants", Society of Manufacturing Engineers, Paper No. A088–635 (1988).

Wicks, Jr., Z. W., "Blocked Isocyanates", In: Progress in Organic Coatings, 3(1975), pp. 73–99.

Wicks, Jr., Z. W., "New Developments in the Field of Blocked Isocyanates", In: Process in Organic Coatings, 9(1981), pp. 3–28.

Anagnostou, T. et al., "Synthesis of Blocked MDI Adducts, Their DSC Evaluation and Effect of Pigmentation", Journal of Coatings Technology, vol. 53, No. 673, Feb. 1981, pp. 35–45.

Boden, Eugene P. et al., "Efficient Preparation of Cyclic Oligomeric Bisphenol A Carbonates: Mechanism for Selective Formation of Cyclic Oligomers", GE Corporate Research and Development, pp. 571–572.

Cambell, Tod W., et al., "Carbodimides. I. Conversion of Isocyanates to Carbodimides with Phospholine Oxide Catalyst", Organic and Biological Chemistry, vol. 84, 3673–3677 (Oct. 1962).

Camberlin, Y. et al., "Synthesis and DSC Study of Model Hard Segments for Diphenyl Methane Diisocyanate and Butane Diol", Journal of Polymer Science: Polymer Chemistry Edition, vol. 20, 383–392 (1982).

Provder, Theodore, "Computer Applications in Applied Polymer Science II Automation, Modeling and Simulation", 195th National Meeting of the American Chemical Society), Toronto, Ontario, Canada, Jun. 5–11, 1988, pp. 428–435.

Yang, W. P., et al., "Thermal degradation of urethanes based on 4,4′-diphenylmethane diisocyanate and 1,4-butanediol (MDI/BDO)", Polymer, vol. 27, vol. 27, (Aug. 1986), pp. 1235–1240.

Saunders, J. H., et al., "High Polymers A Series of Monographs on the Chemistry, Physics, and Technology of High Polymeric Substances", Polyurethane Chemistry and Technology, (1962), pp. 64–128.

Monagle, John, et al., "Carbodiimides. II. Mechanism of the Catalytic Formation from Isocyanates", (unknown), vol. 84, (1962), pp. 4288–4295.

Notification Concerning the Result of the Partial International Search, International Application No. PCT/US92/06493, (Nov. 16, 1992).

Encyclopedia of Polymer Science and Engineering, John Wiley and Sons, vol. 4, (1985) p. 686.

Kurita, Keisuke et al., "Synthesis and Properties of Polyurethanes Derived from Bix-N-Hydroxyimides and Diisocyanates", Journal of Polymer Science: Polymer Chemistry Edition, vol. 17, (1979), pp. 1619–1629.

THERMALLY-REVERSIBLE ISOCYANATE-BASED POLYMERS

This application is a division of application Ser. No. 07/740,335 filed Aug. 8, 1991 now U.S. Pat No. 5,239,039 which is a continuation in part of our prior application Ser. No. 07/651,020 filed Feb. 4, 1991 now U.S. Pat. No. 5,097,010 which is a continuation in part of our prior application Ser. No. 07/475,112 filed Feb. 5, 1990, now abandoned, each and all of which are herein incorporated by reference as if completely rewritten herein.

FIELD OF THE INVENTION

This invention relates generally to polymer compositions that are found by reacting isocyanate and labile-hydrogen functionality. More particular the invention relates to thermally reversible polymer compositions that are capable of thermally dissociating into the reactant isocyanate and labile hydrogen. Such thermally-reversible isocyanate-based polymer compositions are useful, among other things, as coatings, hot-melt adhesives, moldings, in reaction injection molding applications and in composite or laminate fabrication.

BACKGROUND OF THE INVENTION

Organic polyisocyanates have been used as lacquers, films, coatings and hot-melt adhesives. Since isocyanate compounds are very reactive toward groups with an active hydrogen such as hydroxyl, carboxyl, amine and the like, it is common to control such reactivity by adding a mono-blocking or masking agent to the isocyanate (U.S. Pat. No. 3,115,479 to Windermuth et al.) and then reacting the blocked isocyanate with a polyester containing free hydroxyl groups by heating the mixture to deblock the isocyanate.

As seen in U.S. Pat. No. 2,777,881, it is possible to avoid the use of blocking agents by limiting the amount of isocyanate reacted with terminal labile hydrogen groups of a polyester or polyesteramide so as to afford a material that is in an uncured state. Additional isocyanate groups then are added to the uncured product so that a subsequent irreversible cross-linking reaction with moisture can take place to produce the final cured state with appropriate physical properties.

Another solution that avoids premature introduction of moisture into the product is to use a packaging system to protect the isocyanate from moisture prior to use. Adhesives Age, September 1987, p. 42–43.

U.S. Pat. No. 4,166,873 to Gilliam et al discloses improved hot melt adhesives and coatings formed by adding diisocyanate to polyesters. The inventors note that the incorporation of isocyanate into the polyester molecules does not involve chain-extension or significant cross-linking. U.S. Pat. No. 2,982,754 to Sheffer et al. and U.S. Pat. No. 2,876,725 to Buck at al. (example 4) contain additional examples of polyesters modified by the addition of isocyanates.

U.S. Pat. No. 3,503,927 to Chang et al pertains to a cross-linked network structure where the cross-linking is labile to heat and provided by the reaction between a phenolic group and an isocyanate group. U.S. Pat. No. 3,684,769 to Abbott et al. pertains to thermally reversible polyester or polyether urethane polymers with thermally reversible urethane links between polymer chains. U.S. Pat. No. 4,201,853 to Henry et al reveals a thermally-reversible polymeric binder for plastic bonded explosives that reversibly dissociated below 150° C. Wagener and Muria, Polymer Preprints, Vol. 30, No. 1, April 1989 disclose monomeric thermally reversible urethanes whose molecular weight is a function of temperature. Although a polyurethane was prepared, no discussion or data on polymer urethane bond reversibility are given nor are suggestions made as to its applicability.

U.S. Pat. No. 4,608,418 to Czerwinski et al. illustrates an attempt to improve the performance of conventional isocyanate materials by adding a reactive plasticizer to a hot-melt composition formed from a mixture of one or more polyisocyanates and one or more hydroxyl terminated polyols and one or more chain extenders.

Prior-art isocyanate-based polymers have been low molecular weight isocyanate compositions that afford good working properties, e.g., application ease, surface wettability and penetration, leveling ability, and gap-filling capacity. Such materials are commonly moisture-cured to form substituted polyureas after being applied to give durable coating or adhesive materials. However, such materials do not have the high performance characteristics of some of the more costly high-performance polymers such as the polyimides. Typically as one attempts to improve the performance characteristics of the isocyanate-based materials using conventional techniques, high-viscosity and associated low wettability result in a loss of substrate bonding ability. Currently conventional isocyanate polymers do not allow for the high temperature processing, e.g., soldering and thermoforming, of flexible circuit boards and other components such as chips, transformers and motors. Conventional isocyanate polymers typically do not provide cracking resistance at high end-use operating temperatures such as found in high performance aircraft, automotive and computer equipment. The processibility of high performance materials such as polyimides that are used in high performance protective dielectric film or coating materials is more limited than desired. A need continues to exist for a better, melt-processible, high-performance material such as a polyimide for molding applications.

SUMMARY OF THE INVENTION

This invention meets these needs and solves many of these problems by preparing thermally-reversible polymer compositions that contain isocyanate-labile-hydrogen based linkages in the polymer backbone and, if necessary, a controlled number of similar crosslinking groups. These isocyanate-labile hydrogen based linkages provide cured, crosslinked, three-dimensional polymer networks that are insoluble, strong solids, at room temperature, but which become soluble, free-flowing melts at elevated temperatures. The polymers become soluble and fusible due to a thermally reversible dissociation of the isocyanate-labile hydrogen based linkage to the isocyanate and labile-hydrogen starting groups at an elevated temperature.

The isocyanate-labile hydrogen based linkage is a urethane linkage when isocyanate functionality reacts with a terminal hydroxyl functionality. A substituted urea linkage is formed when the labile hydrogen functionality is a terminal amine functionality. Other labile-hydrogen functionalities form an isocyanate adduct of the functionality. Labile-hydrogen functionalities include, but are not limited to, amides, alcohols (including phenols), amines, oximes, triazoles, imidazoles, imidazolines and iminodiazolidinediones.

Generally both aromatic and aliphatic isocyanate and labile-hydrogen functionality form urethane or other bonds that are reversible at some elevated temperature. Typically this temperature is significantly higher for the aliphatic product than for the aromatic product. Intermediate reversing temperatures can be achieved by using a mixed aliphatic and aromatic product. When high performance polymers are desired, an isocyanate containing a polyarylimidazolidine oligomer including poly(parabanic acid) may be used. Often it is desirable to block the isocyanate functionality prior to its reaction with the labile hydrogen functionality so as to prevent unwanted irreversible reactions with moisture and other reactive hydrogen contaminants. As a result, improved handling and stability of the isocyanate functionality is obtained. By using a volatile blocking agent such as phenol, the blocked isocyanate can be reacted with the labile hydrogen functionality by heating the two reactants so as to unblock the isocyanate by vaporizing the phenol leaving the unblocked isocyanate to react with the labile hydrogen functionality.

By controlling the stoichiometry of the reactant labile-hydrogen functionality and the isocyanate functionality, it is possible to obtain a polymer with isocyanate end groups. By using a nonvolatile blocking group in the correct stoichiometry, it is possible to control the reactivity and characteristics of the final polymer product. Provided there are no interfering reactions with the nonvolatile blocking group, it may be added at any stage of the reaction sequence.

Various characteristics may be incorporated into the polymer composition by using oligomers with specific properties. For example, aromatic polycarbonates may be used to provide inherent toughness and impact resistance. By controlling the degree of polymerization of an aromatic polyester oligomer, a melt liquid crystal property can be obtained. Such a liquid crystal property provides solid state anchoring or "virtual crosslinks" so as to minimize the number of actual three dimensional covalent crosslinks that need to be used. Polyimides are used to provide high melting and liquid crystal features.

Polyphenylenesulfides have exceptional strength and rigid, heat stable polymer chains that provide improved hardness, toughness, and solvent resistance to the polymer composition. Although hydroxyl end groups are preferably used as the active or labile-hydrogen end groups, other end groups such as amines, oximes, triazoles, imidazoles and imidazolines may also be used.

To provide ambient or low temperature flexibility and toughness, flexible aliphatic polyester, polyether or polycarbonate prepolymers can be included in the polymer composition. For example, polyesters formed from adipic or sebacic acid, dimer acids, $\alpha$, $\omega$-butane, pentane or hexane diols, hydrogenated (saturated) phthalic acids, other simple diols and polyglycols such as polypropylene glycols can be used.

Melt reversibility is enhanced by incorporating ionic functionality into the polymer composition that is capable of forming thermally-reversible ionic bonds. Typically such thermally-reversible ionic functionality can be achieved by using a functionality such as an aliphatic carboxylate, sulfonate, or phosphonate that is capable of forming ionic bonds with preferably a multivalent cation such as zinc, magnesium, calcium or nickel.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

The benefits and potential benefits of the thermally-reversible polymer composition arise from the basic property of this invention, that is, the ability of the polymer composition to thermally dissociate into its reactant isocyanate and labile-hydrogen functionalities. This basic property allows the composition to flow at a comparatively low temperature while exhibiting high strength, good surface adhesion, low temperature flexibility, relatively fast development of strength, relatively good solvent resistance, good tear resistance, good impact resistance, and high abrasion resistance.

Generally the formation of the compositions of this invention requires reacting high performance oligomers possessing appropriate reactive end groups, i.e., isocyanate and labile-hydrogen functionality capable of forming a isocyanate-labile hydrogen based linkage that is capable of thermal dissociation into the starting materials. Essentially stoichiometric amounts of isocyanate and labile-hydrogen functionality are used.

Two types of structures are prepared. One consists of linear isocyanate-labile hydrogen based linkage in which no trifunctional isocyanates (or labile-hydrogens) are used. Such polymeric compositions have "virtual crosslinks," i.e. crystalline aggregates that act like crosslink sites, based on liquid crystal oligomers. The second type of polymeric composition is a crosslinked isocyanate-labile hydrogen based linkage based on a combination of a diisocyanate-labile hydrogen linear linkage and preferably a component of triisocyanate or a tris-labile hydrogen or both. Both types of structures may also contain ionic functionality capable of forming thermally-reversible ionic bonds.

The thermally-reversible polymer compositions may also be considered as having three building blocks: 1) an isocyanate linking group, 2) a high performance aromatic oligomer backbone group, and 3) a toughening aliphatic prepolymer backbone group.

The isocyanate linking group includes the trifunctional isocyanate crosslinker that is preferably reacted only with the aromatic oligomer backbone group. Various balanced stoichiometry combinations of these three sequences can be combined to produce thermally-reversible polymer compositions that are crosslinked to a controlled extent with aromatic isocyanate-labile hydrogen linkages, or are not covalently crosslinked, but depend on "virtual" crystalline polymer crosslinks for high performance.

Although phenolic hydroxyl is preferably used as the labile-hydrogen functionality, it is noted that other moieties also furnish labile-hydrogen functionality. Such moieties include, but are not limited to, aromatic amines or diamines, aromatic oximes and bis-, bi-, or dioximes, aromatic triazoles and bis- or ditriazoles, and aromatic imidazoles and imidazolines and bis- or diimidazoles and imidazolines. Less preferred are the aliphatic analogs of these compounds and primary amines where excessive cross linking may be undesirable.

Polyisocyanate reactants used in this invention include aromatic, aliphatic, cycloaliphatic or aralkyl polyisocyanates containing from about 6 to 100 carbon atoms. When a linear composition is sought, the polyisocyanate functionality should be about 2. The following polyisocyanates are expected to be useful: 1) aromatic isocyanates and prepolymers based on the following materials: 4,4'-diphenyl methane diisocyanate (MDI), 4,4',4''-triphenyl methane triisocyanate, 1,4-phenylene diisocyanate (DPDI), 1,3-phenylene diisocyanate, xylene diisocyanates such as 5,6-dimethyl-1,3-phenylenediisocyanate and 2,4-dimethyl-1,3-phenylenediisocyanate and other aromatic isocyanates based on other backbones such as naphthalene and 2) aliphatic isocyanates and prepolymers based on the following representative materials: 1,3-cyclohexylene diisocyanate, 4,4'-methylene-bis(cyclohexylisocyanate). A wide variety of polyisocyanates are known in the art as shown in, for example, U.S. Pat. No. 4,608,418 to Czerwinski et al., which is hereby incorporated herein by reference.

The high-performance oligomer backbone group includes, but is not limited to, polycarbonates, aromatic polyesters, polyimides, polyarylimidazolidines (including polyparabanic acids), and polyarylenesulfides with phenolic hydroxyl or other labile-hydrogen end-group functionalities. Generally a labile-hydrogen functionality of about two is preferred.

The polycarbonates can be prepared from bisphenol A and phosgene in a suitable organic solvent using a controlled excess of bisphenol A to produce phenolic hydroxyl end groups. Suitable polycarbonates include those based on or containing in addition to bisphenol A, bisphenol F, 4,4'-dihydroxybenzophenone, 4,4'-dihydroxydiphenylsulfone, hydroquinone, resorcinol, phenolphthalein or 4,4'-biphenol.

Aromatic polyester oligomers are based, for example, on 4- and 3- hydroxybenzoic acid, hydroquinone, resorcinol, 4,4'-biphenol, terephthalic acid, isophthalic acid and the 1,5-disubstituted naphthalenes, in which both groups are either hydroxyl or carboxyl, or one is hydroxyl and the other is carboxyl. The phenol (aromatic hydroxyl) groups are present in the reaction mixture, for example, a melt, predominantly in the form of the acetate ester obtained by reaction with acetic anhydride. Generally about half of the oligomer will contain 4-hydroxybenzoic acid derived moieties. The remainder can be derived from any of the other monomers, so long as the reaction mixture composition is such that the acetoxy and hydroxy to carboxylic acid group ratio will result in a hydroxy-terminated oligomer with a degree of polymerization in the range of 1–20 and more preferably in the range of 1–10. Further the monomer mixture must be selected so that the oligomer will be obtainable as a melt under an inert atmosphere such as nitrogen or argon at temperatures that can be varied between about 200° C. and an upper temperature at which essentially no thermal degradation occurs, i.e., about 300° C. or above.

Illustrative of the polyimides are those based on pyromellitic dianhydride (PMDA) and other commercially available aromatic dianhydrides and aromatic diamines such as p-phenylenediamine, 4,4'-diaminodiphenylether and benzidine. Additional, nonpara-substituted diamines such as m-phenylenediamine and 3,3'-diaminodiphenylether may also be used to lower the melting point of the oligomer.

Polyarylimidazolidines containing imidazolidine moieties such as 4-imino-1,3-imidazolidine-2,5-dione-1,3-diyl; 5-imino-1,3-imidazolidine-2,4-dione-1,3-diyl; 1,3-imidazolidine-2,4,5-trione-1,3-diyl; and mixtures thereof and their preparation are described in U.S. Pat. Nos. 3,591,562 and 3,933,758 to Patton which are hereby incorporated herein by reference. Isocyanates based on p-phenylenediiso-cyanate, MDI, and the other isocyanates listed above and in the Patton patents are reacted with hydrogen cyanide including hydrogen cyanide providers such as acetone cyanohydrin, using a suitable catalyst such as an alkali metal cyanide and a tertiary amine such as triethylamine and an excess of isocyanate to provide first stage isocyanate-terminated oligomers of a controlled degree of polymerization (DP). The isocyanate terminated oligomer can then be blocked with phenol or reacted with any of a number of phenolic hydroxyl terminated oligomers.

To avoid undue cross-linking between the imino hydrogen and isocyanate with resultant gel formation, it has been found desirable to initially use an excess of hydrogen cyanide to isocyanate. After the initial exothermic reaction begins to cool, a stoichiometric amount of isocyante sufficient to react with the excess of hydrogen cyanide and one hydroxyl group of a dihydroxyl end capping group is added to the reaction followed immediately by the addition of the dihydroxyl end capping group. The iminoimidazolidinedione ring(s) in the blocked or reacted oligomer can be hydrolyzed under appropriate conditions with a properly, water-diluted, mineral acid such as sulfuric acid or hydrochloric acid to provide the parabanic acid ring oxygen, i.e., 1,3-imidazolidine-2,4,5-trione, and the ammonium salt of the mineral acid. Generally the polyarylimidazolidines have a degree of polymerization (DP) of about one to about twenty with a lower DP of about four preferred for better product melt processability.

Illustrative polyarylsulfide oligomers suitable for the practice of this invention can be prepared by the condensation of dihaloaryl compounds with sodium sulfide. Labile-hydrogen functionality such as found in halophenolic compounds are used to control the molecular weight of the oligomer and to provide hydroxyl (labile-hydrogen) end capping groups. Sodium sulfide nonahydrate is preferred to sodium sulfide since the latter is unstable and can explode upon percussion or rapid heating. By generating the sodium sulfide in situ and driving off the waters of hydration, the reaction can be safely conducted in an open system, and the reaction progress followed by monitoring the volatile byproducts.

Examples of useful polyarylsulfides include those containing any $C_6$–$C_{14}$ group such as, but not limited to, biphenyl, phenyl ether, anthracene, or anthraquinone and may contain pendant hydroxyl functionality. Biphenyl backbone groups are preferred, not only because they may be readily incorporated synthetically, but because even low molecular weight para-hydrocarbon disubstituted biphenyl compounds show liquid crystal properties. Polyarylsulfides that exhibit liquid crystalline behavior are preferred, since they possess better melt-processing characteristics (lower viscosity and high shear thinning) relative to comparable non-liquid crystalline materials.

Both lower cost dichloro- and higher reactivity dibromoaryl compounds can be used. Representative examples of haloaryl compounds include 4,4'-dibromobiphenyl; 1,5-dichloroanthraquinone; 4,4'-bromophenyl ether; 9,10-dibromoanthracene; 2,4 dibromophenol while 4-bromo (or chloro) phenol can serve as halophenolic end cappers. Non-aqueous solvents capable of dissolving the product are used with the preferred reaction solvent being 1-methyl-2-pyrrolidinone due to its solvency strength, relatively high boiling point and miscibility with product precipitation media such as water, methanol or mixtures thereof.

Toughening prepolymers provide ambient or low temperature flexibility and toughness to the final polymer composition. A wide variety of flexible prepolymer materials may be used including polycaprolactone diols such as Union Carbide PCP, polytetramethylene ether glycols such as DuPont Teracol and polyaliphatic carbonate diols such as PPG Duracarb. Other toughening prepolymers include hydroxy-ended aliphatic polyesters such as adipic acid or sebacic acid polyesters with α, ω, -butane, pentane or hexane diols, saturated phthalic acid-based polyesters (long, or non-drying alkyds) with any of the simple diols and simple polyether glycols such as polypropylene glycols.

Additives as are commonly added to polyurethane products such as antioxidants, UV stabilizers, colorants, fillers, etc., can be added to the polymer composition of the present invention in conventional amounts.

The polymer composition of this invention can be coated onto a suitable substrate by applying such composition to the substrate and then heating the covered substrate to a temperature sufficient to form a bond. Operative methods for covering a surface include powder coating and applying a film to the substrate. In powder coating, the composition is ground into a powder with particle sizes less than about 250 microns and applied to a substrate either by electrostatic spray or by fluidized bed. The covered substrate then can be baked at a temperature sufficient to form a uniform fused coating bonded to the substrate. In another method, a film of the polymer material can be placed on the substrate and then baked. Alternatively, the thermally reversible material can be applied to a heated substrate such that bonding occurs as the material is applied to the substrate. When used as a hot melt adhesive, the polymer composition can be applied between two substrates and the two substrates heated to form a bond. Alternatively the polymer composition can be applied to at least one heated substrate followed by pressing the second substrate to the first. When thermal conductivity is not a significant factor, the heated polymer components can be applied without substrate heating.

The following examples are disclosed to further teach the practice of the invention and are not intended to limit the invention as it is delineated in the claims.

EXAMPLE A

Preparation of Bis-Hydroquinone Ester of Isophthalic Acid

In order to provide an additional quantity of oligomer, a 1.5 fold larger scale production of the bis-hydroquinone ester of isophthalic acid was undertaken. The experimental apparatus and details were essentially identical to those described in EXAMPLE 5 of our previous application, U.S. application Ser. No. 07/651,020, Markle et al, filed on 02/04/92, the disclosure of which is hereby incorporated by reference.

Figure 1A:
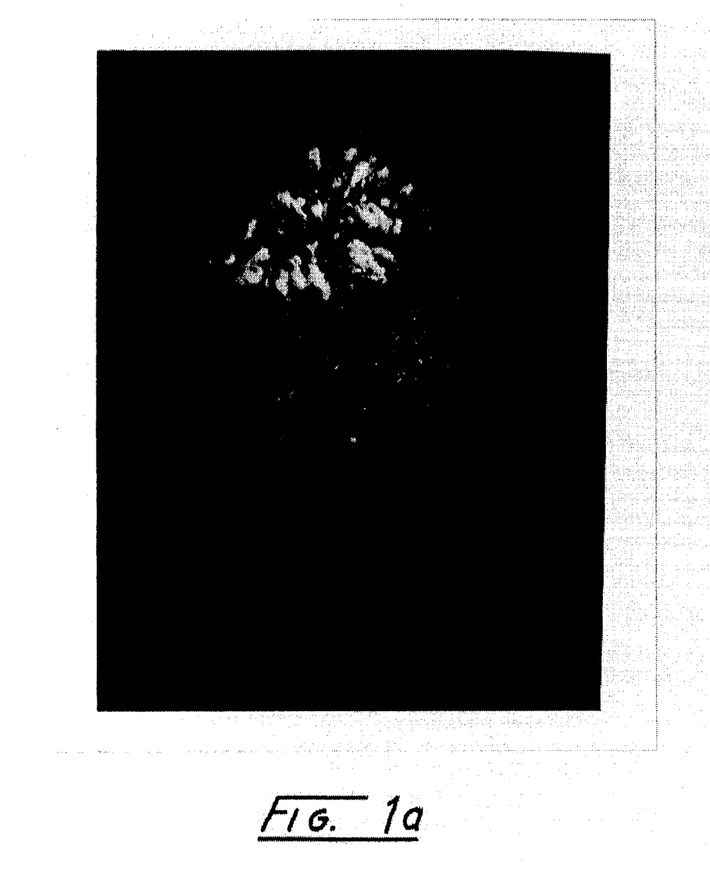
FIGS. 1(a) and 1(b) show the liquid crystalline region of the bis-hydroquinone ester of isophthalic acid (Example A) at 211° C. Plane polarized optical micrographs (400X) obtained with a Mettler FP2 hot stage and an Olympus BH microscope with a 40X ULWD (ultralong working distance) lens.
Figure 1B:
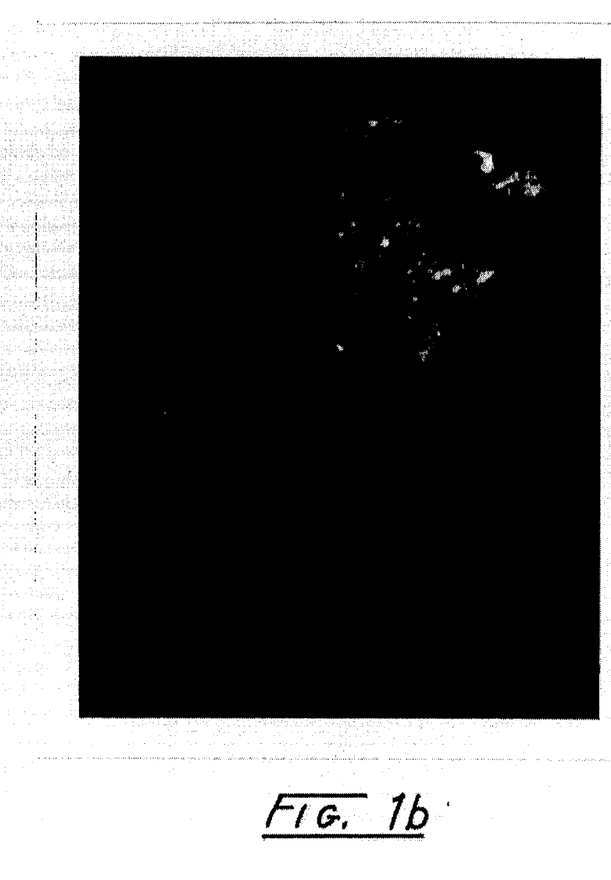

Three hundred seventy-five milliliters of dry ($H_2O<0.001\%$) dimethylacetamide (DMAC; Aldrich 21,707-2) and 65.3 g dry (over $CaH_2$) pyridine (Aldrich 36,057-0; 66.7 cc.; 0.825 moles) were added to a hot-air gun dried 3 1, 3 neck round bottom flask equipped with a stoppered pressure equalizing addition funnel, Trubore stirrer (Teflon paddle), inert gas (argon) inlet and outlet, heating mantle with $I^2R$ Thermowatch controller, and external thermocouple monitor thermometer to measure pot temperature. While stirring slowly with an argon flush, hydroquinone (HQ; 99%; Aldrich 1,790-2; 327.0 g; 3.0 moles) was added over a 5 minute period. The mixture was then heated to ~50° C. where all the hydroquinone dissolved. A solution of isophthaloyl chloride (IPC; Aldrich 36,0570-0 74.6 g; 0,375 moles) in 450 ml additional dry dimethylacetamide was prepared in a 1-liter erlenmeyer flask. Gentle heating was required to completely dissolve the isophthaloyldichloride. The solution was transferred to the 1-liter dropping funnel and added dropwise (~5 drops/second) to the rapidly stirred (50° C.) HQ solution over a 1.5 hour period. The reaction mixture was then slowly heated to ~82° C. where the pyridine appeared to reflux. After an additional 2 hours, the heating mantle was turned off and the solution allowed to cool overnight under an argon flush prior to precipitation. The reaction mixture was precipitated by slowly pouring the solution into 15 l distilled water in a 5 gallon pail equipped with a Talboy stirrer and stainless steel dual blade Jiffy mixer. The white suspension was stirred for an additional 30 minutes, then allowed to settle (digest) for ~2 hours. The precipitate was then filtered with a Büchner funnel and no. 4 Whatman filter paper, and washed with an additional 1800 ml distilled water. A solubility check of the product showed it to be soluble in methanol, ethanol, and isopropanol, and insoluble in methylene chloride and toluene. The product was transferred to an evaporating dish, dried overnight in a vacuum oven (~30 in Hg vacuum, 65° C.), then ground with a mortar and pestle, returned to the vacuum oven for another day (<0.5 wt % loss) and placed in a jar. The final washed, dried, ground product yield was 103.9 g or 79.1 percent recovery (identical to the smaller scale batch-EXAMPLE 5 in our previous application) based on 131.4 g theoretical yield of the bis-hydroquinone ester of isophthalic acid. DSC thermal analysis showed a melting exotherm at 215° C. Optical microscopic analysis using polarized light showed an initial melting point of 211° C., a liquid-crystalline region between 211° and 219° C.

illustrated in FIG. 1 and a complete melt occurring at 223° C.

EXAMPLE B

Preparation of Phenolic-Hydroxyl Terminated Bisphenol A/Phosgene Polycarbonate Oligomers In order to provide an additional quantity of oligomer for hot melt adhesive formulation, a 4.5 fold larger-scale preparation of the phenolic-hydroxyl terminated bisphenol A/phosgene polycarbonate oligomer was undertaken. The experimental apparatus and details were essentially equivalent to those described in EXAMPLE 6 of our previous application, U.S. application Ser. No. 07/651,020, Markle et al, filed on 02/04/91, the disclosure of which is hereby incorporated by reference. The 10x flask volume scale-up (300 ml to 3 l) allowed a doubling of the solvent (methylene chloride) used which provided better mixing and heat transfer. The following was added to a 3 liter, 3 neck round bottom flask equipped with a Trubore stirrer (Teflon paddle), inert gas (argon) inlet and outlet with flowmeter: 4,4'-Isopropylidenediphenol (bisphenol A, Aldrich 13, 302-7, 99.4%, 204.23 g, 0.90 moles); Triethylamine (Aldrich 13,206-3; dried oven $CaH_2$; 234.5 ml, 1.70 moles); and Methylene chloride ($CH_2Cl_2$; Burdick and Jackson 300-4, dried oven $CaH_2$; 1350 ml). The flask was surrounded by a water/ice bath to control pot temperature.

The Phosgene solution (Fluka 79380, 20% in toluene; 1.93 Molar, 2% HCl impurity, 365.14 g, 0.810 moles) was added dropwise (~5 drops/second) over a one hour period, using an ice bath to maintain the pot temperature at 23°±1° C. Precipitate was noted after about 55.5% of the solution had been added. The reaction mixture was stirred for an additional 2.5 hours at which point it appeared to be more viscous. The reaction mixture was allowed to stand overnight under an argon purge. The reaction mixture was then filtered and the precipitate washed with $CH_2Cl_2$ and dried in a vacuum oven. A total of 138.0 g of by-product triethylamine hydrochloride (or ~62.3% theoretical) was recovered. The missing salt was presumed dissolved in the oligomer solution.

The polycarbonate oligomer solution was concentrated down to ~1 l and precipitated in a ten fold excess (~10 l) of reagent grade methanol in a 5 gallon pail equipped with a Talboy stirrer and stainless steel twin-rotor Jiffy mixer. The precipitate was allowed to settle and was then filtered through a Büchner funnel with No. 2 Whatman filter paper and washed with ~1 l additional methanol. The product was then transferred to an evaporating dish and dried overnight (30 in Hg. vacuum; 65° C.). The final polycarbonate product yield was 142.57 g (63.1% theoretical). DSC thermal analysis showed a melting exotherm at 182° C.

EXAMPLE C

Hot Melt Polycarbonate Composition I

The polycaprolactone diol (PCP-530; Aldrich 18,940-5; 3.280 g), paraphenylphenol (PPP; Aldrich 13,434, 97%; 0.0180 g), bis-hydroquinone isophthalic acid diester oligomer (HQ/IPA/HQ, phenol end groups from Example A; 1.696 g) and polycarbonate (PC; from Example B; 0.580 g) were melted together while hand mixing with a stainless steel spatula in a 180 ml electrolytic (deep) beaker under an inert gas (argon) blanket at about 210° C. Trimethyolpropane (TPM, 0.101 g) with a hydroxy equivalent weight of 44.7 was reacted in situ with 4,4' diphenylmethane diisocyanate (crystalline MDI, Isonate 125M, Dow, mp 37° C.; 3.116 g) with a hydroxy equivalent weight of 44.7 to give an aromatic triisocyante that was added to the previous melt while the melt was stirred at ~150° C. It was quickly incorporated in the melt and the viscosity increased to a fairly high level in about five minutes. The melt was heated to 180° C. and the viscosity decreased to a very easily stirred level. Adhesive specimens were then hand assembled by applying melted adhesive to 0.5×1.0 inch areas (1.27×2.54 cm) on the ends of 1×3×0.032 inch (2.54×7.62×0.0813 cm) dull finish steel ¼ hard (R-13) coupons (Q Panel Inc., Cleveland, Ohio). The steel test coupons had been hand cleaned/-degreased first with a Kimwipe soaked with toluene, then one soaked with methyl alcohol, and preheated on a hot plate set at ~180° C. surface temperature. The test samples were adjusted to give 0.5 in$^2$ (1.61 cm$^2$) contact area, firmly pressed together by hand, the excess adhesive exudate scraped away and the assembled test specimen clamped together with two, one-half inch, spring loaded, IDL binder clips. One clip was placed on each side of the overlapped bond area. The partially cooled samples were then placed in a 200° C. air oven briefly (3-5 minutes) to insure that the adhesive had flowed and contacted all the metal surfaces. The samples were then allowed to cool to ambient temperature and placed in a constant temperature/humidity (73 F, 20% relative humidity) room to condition for 24 hours prior to testing.

EXAMPLE D

In-Mold Coatings to Produce Class "A" Finish on Stampable Thermoplastic Sheet Composites When thermoplastic sheet composite parts are formed in a mold, the differential changes in dimension between the glass fiber or other reinforcement and polymer causes surface roughness that is not of class "A" finish surface quality, that is, suitable for exterior finish applications such as automotive finishes. By adding a coating just after part formation, that material can replicate the smooth mold surface and fill in the depressions in the composite. To do this, the coatings must be of low viscosity, have good adhesion to the composite, and not solidify in an uneven manner. Composition I has these characteristics. The two polymers of interest in thermoplastic sheet composites are polypropylene (PP) and polyethylene terephthalate (PET). Both are poorly adhered to by most coatings. Therefore, conventional in-mold coatings used to provide a class "A" finish to other composites, such as those based on sheet molding compound, cannot be used with polypropylene and polyethylene terephthalate composites. Composition I was found to adhere tightly to both of these materials fulfilling one of the primary requirements for the in-mold coating. No other material is known to do this to our knowledge. The polymer also has a low viscosity meaning it will flow easily to provide good coverage over the molded part.

The tight, in-mold bond on the polypropylene and polyethylene-terephthalate composites with composition I was obtained at 350° F. and 600-800 psi pressure. Temperature higher than 400° F. resulted in irregular coated surfaces. A thin, 4-6 mil thick coating was produced on the composites providing both a tightly-adhering, and high gloss finish.

A 5-mil thick Kapton (DuPont polyimide) sheet between composition I and the smooth mold surface permitted the composite to release from the mold. Attempts to use thin Teflon sheets as release agents resulted in dull, irregular coatings.

To test the adhesion of the composition I to the polypropylene composite, tensile lap shear specimens were prepared by sandwiching composition I between two layers of polypropylene glass-filled composite with a 1"×1" overlap. Test results are given in Table 1.

EXAMPLE E

Preparation of Phenolic-Hydroxyl Terminated Biphenylenesulfide Oligomers

The following were added to a 3 liter, 3 neck round bottom flask equipped with a Trubore stirrer (Teflon paddle), inert gas (argon) inlet and outlet with flowmeter, Claisen head with both pot and distillate thermometers, water cooled distillation condenser, distillation take-off, and receiver flask: 91.74 g 4,4'-Dibromobiphenyl (4,4' DBBP; Aldrich 92-86-4; 98%, 0.30 moles); 26.21 g 4-Bromophenol (4-BP; Aldrich 106-41-2; 99%; 0.15 moles); 90.07 g Sodium Sulfide Nonahydrate ($Na_2S \cdot 9H_2O$; Aldrich 1313-84-4; 0.375 moles); 39.75 g Sodium carbonate ($Na_2CO_3$; Baker 3602-01; 0.375 moles); and 1.8 l 1-methyl-2-pyrrolidinone (NMP; Aldrich 27,045-8, 99+%). The flask was surrounded by a 2-piece Glasscol spherical heating mantle with internal thermocouple leads to measure flask surface temperature, connected to independent Variac rheostats, controlled by an $I^2R$ Thermowatch temperature L8-2000 SS capacitance monitor attached to the pot thermometer.

The Aquamarine blue mixture was stirred under a slow Argon purge (0.3–0.4 SCFH) while heating (~40/~55 V; Top/Bottom) to the target polymerization temperature of ~165° C. As the pot temperature rose over ~108° C., condensate was noted so the Claisen adapter was insulated with glass wool, the Argon flow rate increased to ~1.0 SCFH, and the distillate (water from $Na_2S \cdot 9H_2O$) collected. The temperature was maintained at ~165° C. for 2.5 hours during which time the distillate collection rate slowed and vapor temperature dropped. The heating mantles were then removed and the flask was cooled with an air line to near room temperature. The resulting dark emerald green solution was slowly added to rapidly stirring 14 l of water/methanol (71/29, V/V) in a 5 gallon pail equipped with a Trubore stirrer and stainless steel twin-rotor Jiffy mixer. The beige precipitate/suspension was stirred for ~30 minutes, then allowed to settle overnight.

The product was recovered by filtration using a Büchner funnel and no. 4 Whatman filter paper, initially dried, then placed in a 25–50 μ glass butted funnel and washed with ~500 ml methanol. The washed product was then placed in a vacuum oven (~30 in Hg, 65° C.) dried, ground with a mortar and pestle, returned for further drying and placed in a screw-cap amber bottle. The final washed, dry, ground product yield was 60.85 g or ~79.6 percent of the theoretical yield of 76.45 g for the DP=4 oligomer (MW=955.3 g/mole theoretical).

Figure 2A:
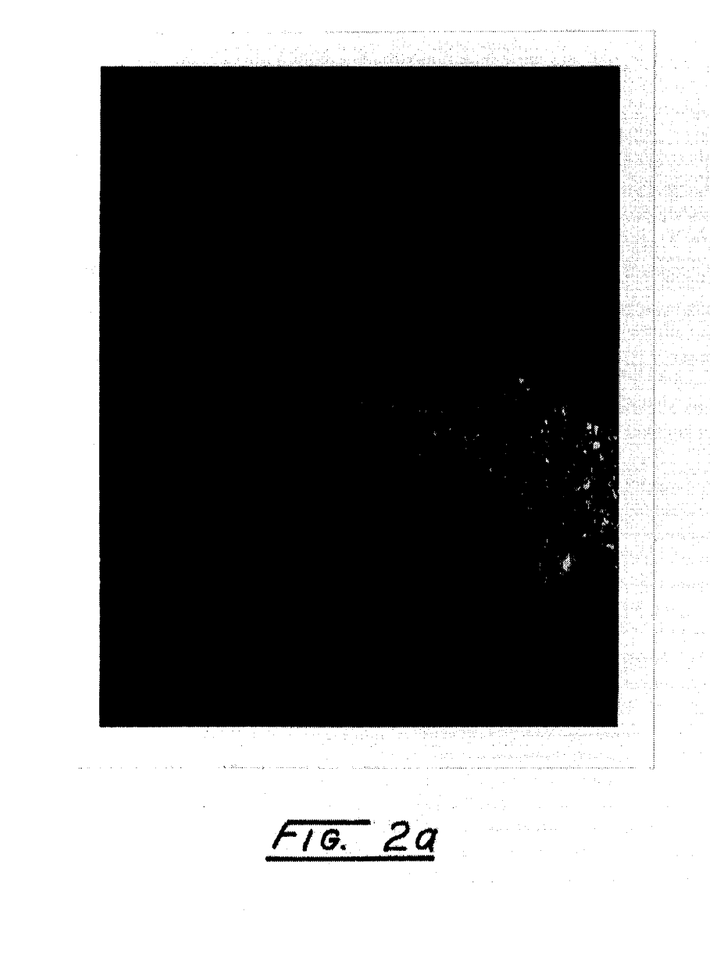
FIGS. 2(a) and 2(b) show the liquid crystalline region of the phenolic-hydroxyl terminated biphenylene sulfide oligomer (Example E) at ~200° C. Plane polarized optical micrographs (400X) obtained with a Mettler FP2 hot stage and an Olympus BH microscope with a 40X ULWD (ultralong working distance) lens.
Figure 2B:
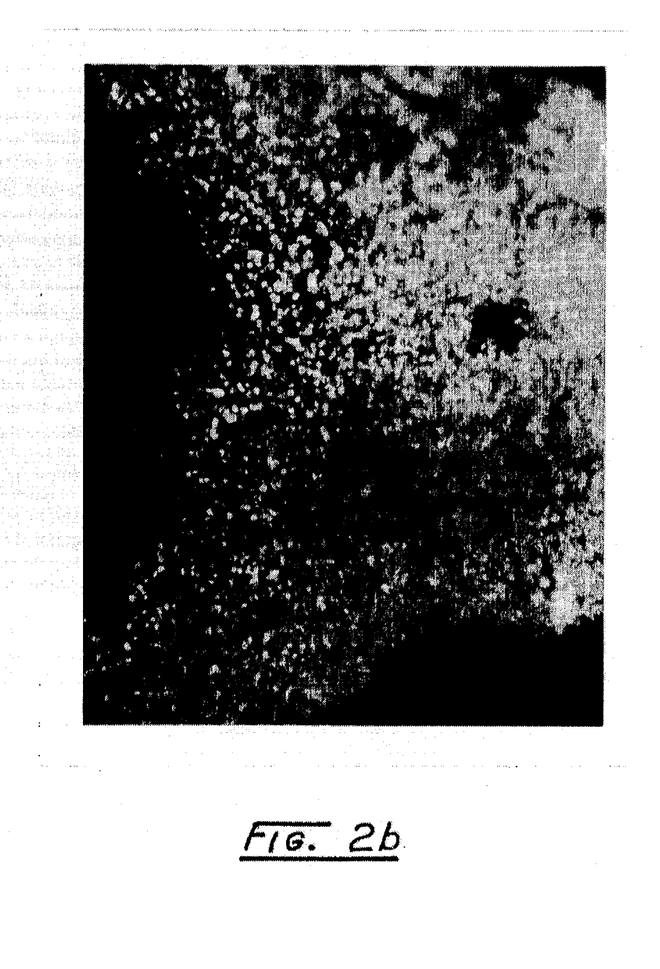

Samples of the product were analyzed using Differential Scanning Calorimetry (DSC), Infrared Spectroscopy (ATR) and optical microscopic techniques. The DSC showed a single sharp peak near ~153° C., indicating a relatively pure compound. The infrared analysis showed the presence of hydroxyl end-group functionality. The optical microscopy (using polarized light) as a function of temperature indicated that the material possessed strong liquid-crystalline behavior as shown in FIG. 2 over a broad range, from ~175° C. to over ~220° C., completely melting at ~242° C. The presence of reactive hydroxyl end-group functionality was confirmed by reaction of the product with a stoichiometric amount of MDI producing a thick urethane polymer.

Hot melt adhesive test samples were prepared as described previously under EXAMPLE C, Hot Melt Polycarbonate Composition I, but with the phenolic-hydroxyl terminated biphenylenesulfide oligomer being substituted for the polycarbonate portion on an equivalent basis. Lap shear strength results were obtained and preliminary indicated the material to have a lap shear strength of about two times that of commercial polyester PE 6300 from H. B. Fuller.

EXAMPLE F

Preparation of Poly 4(or 5)-imino-1,3-imidazolidine-2,5(or 4)-dione-1,3-diyl Oligomers with Phenolic Hydroxyl End Groups A 500-ml three-neck flask was fitted with a Trubore stirrer with Teflon blade (driven by a T-line laboratory electrical stirrer), an argon gas inlet and a thermometer positioned to penetrate into the reaction solution via an adapter with a gas outlet side arm. The flask was flame dried and cooled under an argon flush. Then 31.7 g (0.127 mole) of MDI (Dow Isonate 125M) and 150 ml NMP (Aldrich 27,045-8, 99+ percent, dried over Fluka 3A type molecular sieve 69828) were placed in the flask. The NMP was heated until the MDI all just dissolved, then cooled to near ambient. Then 8.896 g acetone cyanohydrin (Aldrich A1,000-0 dried over same Fluka molecular sieve) were added by syringe. The 1.0 cc of triethylamine (TEA; Aldrich 13,206-3 dried over the Fluka molecular sieves) was added by syringe, followed by 2.5 cc of a solution of NaCN (0.2000 g/100 ml NMP, same NMP as above). Immediately an exotherm was noted. The temperature of the well stirred solution rose from 28° C. to 43.8° C. over the next 1 hr 17 mins. The reaction flask was insulated with Pyrex wool during this period. The temperature then began to drop. After about 15 mins, it was 43.0° C. Then 4.65 g (0.0422 mole) of Aldrich H1,790-2 hydroquinone, 99 percent, was added and dissolved in 25 ml of the same dry NMP. It was added all at once. The temperature immediately began to rise again. In 7 mins, it had reached 47.0° C. At this point, the viscosity increased very rapidly and the initially moderately viscous, clear light yellow solution gelled to a very stiff gel which could not be stirred. The gel was left to stand overnight under the Ar flush. The next morning the gel had completely disappeared. The mixture had spontaneously reverted to a clear easily stirred moderate viscosity liquid. A small sample of this solution when precipitated in methanol, washed with methanol and dried, melted to a clear moderate viscosity liquid at 270°–295° C. Apparently a crosslinking reaction of terminal isocyanate groups with pendant imino (=NH) sites produced a branched oligomer which crosslinked when chain extended with the hydroquinone. However, unreacted hydroquinone hydroxyl groups then may have displaced these crosslinking urea linkages to form more stable urethane bonds. Hence the final product may have assumed the nearly linear oligomer structure that the 6/5 MDI/HCN mole ratio was chosen to provide. The end groups are presumed to be p-hydroxyphenyl groups from end-capping of the terminal isocyanates with hydroquinone. This is a unique, difunctional phenolic end-group oligomer.

EXAMPLE G

Preparation of Polyparabanic Acid Oligomer With Phenolic Hydroxyl End Groups A similar reaction to Example F was carried out using the same reagents and apparatus. However, an excess of the HCN provider (acetone cyanohydrin) was used in a first stage reaction. Hence 8.511 g (0.1000 mole) of acetone cyanohydrin were added to a solution of 12.151 g (0.0485 mole) MDI in 150 cc NMP. To this were added 0.5 cc of the dry TEA, followed by 2.0 ml of the 0.2000 g/100 ml solution of NaCN in NMP. An immediate exotherm was noted. In 15 mins the temperature had climbed from 28° C. to 53.5° C. It then started to fall and reached 47° C. after another 10 mins. Then 25.026 g (0.1000 mole) MDI in 100 cc warm NMP and 11.011 g (0.0500 mole) hydroquinone in 50 cc warm NMP were added separately, the MDI first all at once, followed by the HQ, all at once, about 2 mins later. Another exotherm occurred with the temperature rising to 58° C. in about 10 mins. The yellow clear solution increased in viscosity initially, then fell again to a moderate level. No gel formation was noted. The mixture was stirred overnight under argon at a moderate rate while maintaining the temperature at 45° C. The product solution was perhaps slightly less viscous but otherwise unchanged. It was precipitated in ~3 liters of methanol in a Waring blender run at moderate speed and filtered on a coarse (~25 μm) fritted funnel. It was washed seven times in the blender with about 600 ml portions of methanol, until the methanol wash demonstrated no turbidity when dropped into tap water. A small portion was dried (0.7 g) and the melting point of the imino-group containing oligomer measured on the Fisher Johns melting point hot stage. It melted at 240°–250° C.

The remainder of the oligomer was redissolved in about 350 ml of NMP in the blender. Then 11 g of concentrated HCl, diluted with an equal volume of distilled water, was added to the rapidly stirred yellow, clear solution. Copious precipitation of NH$_4$Cl occurred immediately and the solution became a clear, green color. The amount of HCl used was slightly in excess of the amount theoretically required (~9.8 g) to convert the C=NH groups to —C=O groups, white providing NH$_4$Cl by-product. The clear supernatant was then precipitated in distilled water and filtered through the 25 μm frit. The white powder was washed three times with water, three times with methanol and three times with 30°–60° C. pet ether and air dried. The slightly yellowish-white powder melted (Fisher Johns) at 220°–230° C. DSC analysis indicated a melting point of ~207° C. Hot melt adhesive test samples were prepared as described under EXAMPLE C, Hot Melt Polycarbonate Composition I, but with the polyparabanic acid oligomer with phenolic hydroxyl end groups being substituted for the polycarbonate portion on an equivalent basis. Lap shear strength results were obtained and preliminary results indicated the material to be comparable to commercial polyester adhesives such as PE 6300.

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

TABLE 1

LAP SHEAR STRENGTH OF COMPOSITION I AND COMMERCIAL (PE 6300) HOT MELT ADHESIVES WITH POLYPROPYLENE SUBSTRATES
(Adhesive Area 1" × 1" = 1 sq in.)

| Adhesive | Trial | Load, lbs | Lap Shear Strength, psi | | |
|---|---|---|---|---|---|
| | | | | avg | rounded |
| Composition I | a | Broke in grips | | | |
| | b | 53 | 53 | | |
| | c | 83.5 | 83.5 | 59.8 | (60) |
| | d | Broke in grips | | | |
| | e | 43 | 43 | | |
| PE 6300 | a | 118 | 118 | | |
| | b | 61 | 61 | 73.7 | (74) |
| | c | 42 | 42 | | |

We claim:

1. A polyarylsulfide oligomer comprising a biphenylsulfide repeating unit.

2. The polyarylsulfide oligomer of claim 1 further comprising phenolic hydroxide end groups.

3. The polyarylsulfide oligomer of claim 1 having a degree of polymerization of about one to about twenty.

4. The polyarylsulfide oligomer of claim 3 having a degree of polymerization of about three to about five.

* * * * *

UNITED STATES PATENT AND TRADEMARK OFFICE
CERTIFICATE OF CORRECTION

PATENT NO. : 5,387,667
DATED : February 7, 1995
INVENTOR(S) : Richard A. Markle and Joel D. Elhard It is certified that error appears in the above-indentified patent and that said Letters Patent is hereby corrected as shown below:

TITLE PAGE

"[75] Inventors: Richard A. Markle, Columbus; Joel D. Elhard, Hilliard; Donald M. Bigg, Columbus; Sylvester Sowell, Columbus; Phyllis L. Brusky, Columbus; George E. Cremeans, Groveport, all of Ohio" should be
--[75] Inventors: Richard A. Markle, Columbus; Joel D. Elhard, Hilliard, all of Ohio --.

Column 8, line 33, "0,375" should be -- 0.375 --.

Signed and Sealed this

Twenty-first Day of November, 1995

Attest:

BRUCE LEHMAN

Attesting Officer

Commissioner of Patents and Trademarks